(12) United States Patent
Wallace et al.

(10) Patent No.: US 7,896,955 B2
(45) Date of Patent: Mar. 1, 2011

(54) LOW TEMPERATURE SOLIDS REMOVAL SYSTEM FOR GASIFICATION

(75) Inventors: Paul Steven Wallace, Katy, TX (US); Jyung-Hoon Kim, Kingwood, TX (US)

(73) Assignee: General Electric Company, Schenectady, NY (US)

( * ) Notice: Subject to any disclaimer, the term of this patent is extended or adjusted under 35 U.S.C. 154(b) by 470 days.

(21) Appl. No.: 11/938,564

(22) Filed: Nov. 12, 2007

(65) Prior Publication Data

US 2009/0120290 A1 May 14, 2009

(51) Int. Cl.
*B01D 47/00* (2006.01)

(52) U.S. Cl. .............. 95/197; 95/202; 95/204; 95/205; 95/223; 210/787; 210/788; 210/800; 48/197 R; 48/198.3

(58) Field of Classification Search .......... 210/767; 95/149, 197, 195, 196, 200, 202, 205; 96/234, 96/243; 55/421; 48/197 R, 198.3
See application file for complete search history.

(56) References Cited

U.S. PATENT DOCUMENTS

| | | | |
|---|---|---|---|
| 4,193,772 A | | 3/1980 | Sharp |
| 4,466,810 A | * | 8/1984 | Dille et al. ............... 48/197 R |
| 4,526,903 A | | 7/1985 | Cummings |
| 4,652,363 A | * | 3/1987 | Miller ....................... 209/734 |
| 2004/0164005 A1 | * | 8/2004 | Allen, III ................... 209/725 |
| 2004/0165005 A1 | * | 8/2004 | Yoshikawa et al. ......... 345/702 |
| 2006/0165582 A1 | | 7/2006 | Brooker et al. |

FOREIGN PATENT DOCUMENTS

| | | |
|---|---|---|
| AU | 532788 | 10/1983 |
| DE | 10152985 | 5/2003 |
| DE | 10222721 | 11/2003 |
| EP | 0 219 612 | 4/1987 |
| EP | 1 502 652 | 2/2005 |
| WO | 03022959 | 3/2003 |

OTHER PUBLICATIONS

EPA. "Site Technology Capsule Texaco Gasification Process". EPA Office of Research and Development. Apr. 1995. 12 pages.
International Search Report, PCT/US2008/074704, Date mailed May 8, 2009, Search Report having 5 pages.

* cited by examiner

*Primary Examiner* — Duane Smith
*Assistant Examiner* — Thomas Bennett McKenzie
(74) *Attorney, Agent, or Firm* — Cantor Colburn LLP

(57) ABSTRACT

Disclosed is a process for removing coarse solids and fine solids from a gas, which includes wetting the coarse solids and fine solids in a first chamber thereby separating the coarse solids and fine solids from the gas. The first chamber also contains liquid to cool the coarse solids and the fine solids. The coarse solids and fine solids are routed to a liquid-filled second chamber where the coarse solids settle to the bottom. The liquid in the second chamber, still containing the fine solids is flushed into a third chamber where the fine solids are separated from the liquid. The separated fine solids and coarse solids are then routed to a fourth chamber.

12 Claims, 1 Drawing Sheet

LOW TEMPERATURE SOLIDS REMOVAL SYSTEM FOR GASIFICATION

BACKGROUND

This invention relates to gasification systems and processes. In particular the invention relates to a low-temperature system and process for removing solids byproducts of a gasification process.

Gasification is a process for the production of power, chemicals, and industrial gases from carbonaceous or hydrocarbon feedstocks such as coal, heavy oil, and petroleum coke. Gasification converts carbonaceous or hydrocarbon feedstocks into synthesis gas, also known as syngas, comprising primarily hydrogen and carbon monoxide. The resultant syngas is a feedstock for making useful organic compounds or can be used as a clean fuel to produce power.

In a typical gasification plant, a carbonaceous or hydrocarbon feedstock and molecular oxygen are contacted at high pressures within a partial oxidation reactor (gasifier). The feedstock and molecular oxygen react and form syngas. Non-gasifiable ash material and unconverted and/or incompletely converted feedstock are by products of the process and take essentially two forms: molten slag and smaller particles referred to as "fines". A quench process cools and saturates the syngas and also causes the molten slag to be rapidly cooled and solidified into irregularly shaped particles of varying size in a quench chamber. The slag particles are separated from the syngas, and are captured in the quench chamber.

Coarse slag flows by gravity from the quench section of the gasifier into a pressurized lockhopper at regular intervals. Afterwards, the lockhopper is automatically isolated from the gasifier, depressured, and emptied onto a drag conveyor. Water in the lockhopper is replaced with grey water from a lockhopper flush drum and the system is repressurized. The slag is screened to reduce moisture, and sent to disposal offsite. The reclaimed water is sent to the vacuum flash drum in the black water flash section of the plant.

A separate system is used to remove fines from the system after quenching. The quench water containing fines is referred to as black water. A black water flash section concentrates solids and removes dissolved syngas from the black water. Flashing is a process by which the black water passes through a flash valve into a flash drum which is of lower pressure. The pressure reduction causes the black water to be partially evaporated and cooled. To achieve the desired amount of cooling, black water is flashed in two stages, a low-pressure flash and a vacuum flash. The cooled black water is sent a filtration step. Cooling the black water to under 200 F allows the recycling of the fines in a slurry grinding mill for potential reuse as gasifier feedstock.

The use of a separate system for the fines removal increases maintenance costs and decreases gasifier availability. The flash valve conditions are erosive requiring expensive valves that must be frequently replaced. In addition, scale formed in a syngas scrubber, which flows through the black water flash section plugs the small openings in the flash valves requiring gasifier shutdowns or potentially unsafe purges to atmosphere.

Additionally, extra equipment is required to implement this system. Separate heat exchangers in which the resultant vapor from each of the flash stages must be condensed, and condensate collection and recycle systems. Also, a vacuum system is required for the vacuum flash stage. Furthermore, the black water lines are in solids service and must be sloped downward causing increased gasifier and scrubber height requirements.

What is needed is a combined low-temperature system for removing slag and fines resulting from gasification that reduces maintenance costs and plant capital costs, increases plant availability, and reduces plant scrubber structure height.

BRIEF DESCRIPTION

The invention solves the aforementioned problems by a process that removes coarse solids and fine solids from a syngas and includes wetting the coarse solids and fine solids in a first chamber thereby separating the coarse solids and fine solids from the syngas. The first chamber also contains liquid to cool the coarse solids and the fine solids. The coarse solids and fine solids are routed to a liquid-filled second chamber where the coarse solids settle to the bottom. The liquid in the second chamber, still containing the fine solids is flushed into a third chamber where the fine solids are separated from the liquid. The separated fine solids and coarse solids are then routed to a fourth chamber.

These and other objects and features of the present invention will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The FIGURE is a diagram of an embodiment of a slag and fines handling system.

DETAILED DESCRIPTION

Figure 1:
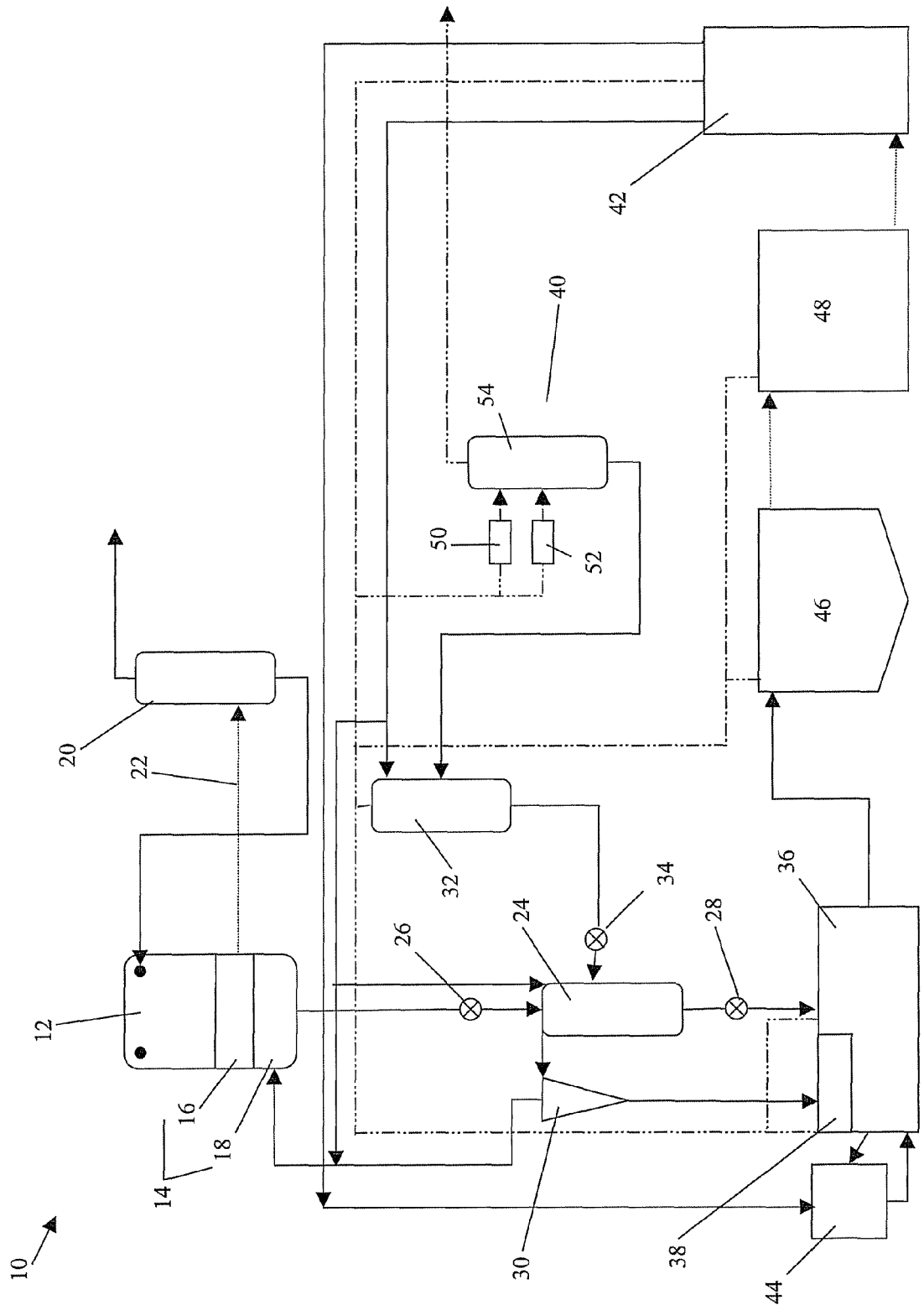

An embodiment of an advanced slag and fines handling system 10 is shown in FIG. 1. Syngas containing slag and fines, solid byproducts of a gasification process, enters a quenching section 12 of the gasifier where the syngas, as well as the slag and fines, is quenched. The quenching section 12 comprises a water sump 14 including a hot zone 16 maintained at 300-500 degrees F., and a cold zone 18 with a temperature of less than 200 degrees F. Quench water pumped from a syngas scrubber 20 enters the quenching section 12, where the quench water wets the slag and fines in the syngas. The wetted slag and fines fall out of the syngas and into the water sump 14. The slag and fines fall into the hot zone 16 and then out of the hot zone 16 and settle in the cold zone 18. The quenched syngas and water from the hot zone 16 exit the quenching section 12 through a syngas/overflow conduit 22 into the syngas scrubber 20. The scrubber 20 performs a final solids removal from the syngas and outputs solids free syngas for further processing or use. Water from the scrubber 20 is pumped to the quenching section 12 as needed to quench syngas containing slag and fines as described above.

The slag and fines that have settled into the cold zone 18 are removed from the quenching section 12 through a water-sealed, lockhopper 24 filled with water and disposed below the quenching section 12. A feed valve 26 is disposed between the lockhopper 24 and the quenching section 12. When the feed valve 26 is periodically opened, a continuous column of water is formed between the lockhopper 24 and the quenching section 12. The slag ill the quenching section 12 is then free to flow through the feed valve 26 and into the lockhopper 24. Afterwards, the lockhopper 24 is depressurized and flushed with water when a flush valve 34 is opened, allowing water to enter the lockhopper 24 from a flush drum 32. A purge valve 28 is opened and slag contained in the lockhopper 24 drops into a drag conveyor 36.

Overflow water containing fines from the lockhopper 24 is routed to a hyrdoclone 30. As fluid enters the hydrocyclone 30, flow is directed tangentially near the top of the hydrocyclone 30. The entire contents of the hydrocyclone 30 spins, creating a centrifugal force in the liquid. The fines move outward toward the wall of the hydrocyclone 30 where they spiral down the wall to an outlet at the bottom of the hydrocyclone 30. The fines exit the hydrocyclone 30 through a choke tube (not shown) as underflow to a deaeration section 38 of the drag conveyor 36. The hydrocyclone 30 may include an erosion-resistant liner of a ceramic material or the like or hard surfacing of metal carbides or nitrides to extend the functional life of the hydrocyclone 30. To remove additional fines, overflow water from the hydrocyclone 30 may be routed through additional hydrocyclones 30, repeating the above-described process until a desired level of fines removal is achieved. After the desired amount of fines is separated out, overflow water from the hydrocyclone 30 is recirculated to the cold zone 18.

In the deaeration section 38, gasses are released from the fines and the gasses are removed to a vapor recovery unit 40. The slag in the drag conveyor 36 is moved to a slag screen 44 where the slag is rinsed with water from the waste water treatment unit 42. The rinse water from the slag screen 44 and the fines from the deaeration section 38 are moved to a settler 46. The settler 46 performs a final separation of the fines from the rinse water. The fines are removed from the settler 46, and are routed either directly to a gasifier (not shown) for reprocessing, or to coal wet grinding mills (not shown) and then recycled to the gasifier with a feed coal slurry. The overflow water from the settler 46 is routed to a gray water tank 48.

The gray water is pumped from the gray water tank 48 to the waste water treatment unit 42. After treatment, softened gray water may be used throughout the system. For example, softened gray water may be used to fill the flush drum 32, and to purge the lockhopper 24 during the collection portion of its cycle. Soft gray water is also added to water exiting the hydrocyclone 30 and circulated back through the cold zone 18. After additional processing, purified water from the waste water treatment unit 42 is used to rinse slag on the slag screen 44.

The system also includes a vapor recovery unit 40. Vapor is routed to the vapor recovery unit 40 from various points in the system 10, including the drag conveyor 36, the flush drum 32, the settler 46, and the gray water tank 48. In this embodiment, the vapor recovery unit 40 includes a first steam ejector 50 and a second steam ejector 52 that provide a vacuum to urge the vapor into the knockout drum 54. The first steam ejector 50 is in continuous service and the second steam ejector 52 is intermittently used to produce the desired amount of vacuum during depressurization of the lockhopper 24. The vapor in the knockout drum 54 is then condensed by a condenser (not shown) in the knockout drum 54. Any incompressible gas in the knockout drum 54 is recycled back to the gasifier.

While embodiments of the invention have been described above, it will be understood that those skilled in the art, both now and in the future, may make various improvements and enhancements which fall within the scope of the claims which follow. These claims should be construed to maintain the proper protection for the invention first described.

The invention claimed is:

1. A process for removing coarse solids and fine solids from a syngas comprising:
    wetting the coarse solids and fine solids in a first chamber thereby separating the coarse solids and a portion of the fine solids from the syngas;
    cooling the coarse solids and fine solids in a liquid in the first chamber;
    urging the coarse solids and fine solids into a liquid-filled second chamber;
    allowing the coarse solids to settle to the bottom of the second chamber;
    flushing the liquid containing the fine solids from the second chamber into a third chamber;
    separating the fine solids from the liquid in the third chamber;
    urging the coarse solids from the second chamber into a collection chamber for separation of the coarse solids, the fine solids and the liquid; and
    urging the fine solids from the third chamber into the collection chamber.

2. The process of claim 1 further comprising:
    rinsing the coarse solids in the collection chamber with water;
    urging the water and the fine solids from the collection chamber to a fifth chamber;
    settling the fine solids to the bottom of the fifth chamber.

3. The process of claim 2 further comprising:
    removing the fine solids from the fifth chamber;
    reprocessing the fine solids into fuel.

4. The process of claim 1 further comprising:
    removing the syngas from the first chamber to a scrubber;
    removing fine solids from the syngas in the scrubber; and
    outputting solids-free syngas from the syngas scrubber.

5. The process of claim 1 wherein the coarse solids and fine solids are cooled to under 200 degrees F. in the first chamber.

6. The process of claim 1 wherein the liquid-filled second chamber is a lockhopper.

7. The process of claim 1 wherein the fine solids are separated from the liquid in the third chamber by a centrifugal force.

8. The process of claim 7 wherein a hydrocyclone creates the centrifugal force.

9. The process of claim 7 wherein the hydrocyclone is multi-staged to improve removal of the fine solids.

10. The process of claim 7 wherein the hydrocyclone includes an erosion-resistant liner of a ceramic material or hard surfacing of metal carbides or nitrides.

11. The process of claim 1 further comprising:
    collecting vapor from the collection chamber and the fifth chamber; and
    condensing the vapor into a liquid that is reusable in the process.

12. The process of claim 1 wherein the fine solids are urged from the third chamber to a deaeration section of the collection chamber.

* * * * *